US011975745B2

(12) United States Patent
Bezold et al.

(10) Patent No.: US 11,975,745 B2
(45) Date of Patent: May 7, 2024

(54) MODULAR FOOT PLATFORM FOR A DRIVER'S CAB OF A RAIL VEHICLE

(71) Applicant: Siemens Mobility GmbH, Munich (DE)

(72) Inventors: Michael Bezold, Munich (DE); Thomas Hengstenberg, Groebenzell (DE)

(73) Assignee: Siemens Mobility GmbH, Munich (DE)

( * ) Notice: Subject to any disclaimer, the term of this patent is extended or adjusted under 35 U.S.C. 154(b) by 850 days.

(21) Appl. No.: 17/053,453

(22) PCT Filed: Apr. 25, 2019

(86) PCT No.: PCT/EP2019/060589
§ 371 (c)(1),
(2) Date: Nov. 6, 2020

(87) PCT Pub. No.: WO2019/214956
PCT Pub. Date: Nov. 14, 2019

(65) Prior Publication Data
US 2021/0253141 A1    Aug. 19, 2021

(30) Foreign Application Priority Data
May 7, 2018  (DE) .......................... 102018207035

(51) Int. Cl.
*B61C 17/04* (2006.01)
*B60N 3/06* (2006.01)

(52) U.S. Cl.
CPC .............. *B61C 17/04* (2013.01); *B60N 3/063* (2013.01)

(58) Field of Classification Search
CPC ......... B61C 17/00; B61C 170/04; B60N 3/06; B60N 3/063
See application file for complete search history.

(56) References Cited

U.S. PATENT DOCUMENTS

| 8,757,580 B2 * | 6/2014 | Volke | ..................... B61D 37/00 242/375.3 |
| 9,924,795 B2 * | 3/2018 | Mehlan | ................ A47C 16/025 |
| 2012/0112035 A1 | 5/2012 | Volke et al. | |
| 2013/0220168 A1 * | 8/2013 | Volke | ..................... B61C 17/04 105/342 |

(Continued)

FOREIGN PATENT DOCUMENTS

| AU | 2003203693 A1 | 11/2004 |
| CN | 101780792 A | 7/2010 |

(Continued)

*Primary Examiner* — S. Joseph Morano
*Assistant Examiner* — Cheng Lin
(74) *Attorney, Agent, or Firm* — Laurence A. Greenberg; Werner H. Stemer; Ralph E. Locher (57) ABSTRACT

A modular foot platform for a driver's cab of a rail vehicle includes at least a base frame having a height adjustment mechanism, an intermediate frame mounted on the base frame, and a step plate lying on the intermediate frame. The height adjustment mechanism includes at least one operating element, which is disposed at least partially in a region on or above the top side of the step plate, which top side faces away from the base frame. A rail vehicle having a driver's cab and a modular foot platform disposed therein is also provided.

9 Claims, 7 Drawing Sheets

(56) References Cited

U.S. PATENT DOCUMENTS

2018/0050671 A1\* 2/2018 Yahagi .................. B60K 26/02

FOREIGN PATENT DOCUMENTS

| CN | 202225869 U | | 5/2012 | | |
|---|---|---|---|---|---|
| CN | 203799294 U | | 8/2014 | | |
| CN | 204415388 U | | 6/2015 | | |
| CN | 106864471 A | \* | 6/2017 | | |
| CN | 106864471 A | | 6/2017 | | |
| CN | 206678987 U | | 11/2017 | | |
| CN | 107901928 A | \* | 4/2018 | ............ | B61C 17/04 |
| CN | 107933584 A | | 4/2018 | | |
| CN | 107963088 A | | 4/2018 | | |
| DE | 202016004888 U1 | | 10/2016 | | |
| DE | 202016004888 U1 | \* | 11/2016 | | |
| JP | 2011143811 A | | 7/2011 | | |
| PL | 225552 B1 | \* | 4/2017 | | |
| RU | 74358 U1 | | 6/2008 | | |
| WO | 2015106807 A1 | | 7/2015 | | |

\* cited by examiner

MODULAR FOOT PLATFORM FOR A DRIVER'S CAB OF A RAIL VEHICLE

BACKGROUND OF THE INVENTION

Field of the Invention

The invention relates to a modular foot platform for a driver's cab of a rail vehicle, to a method for installing such a modular foot platform, and to a rail vehicle having a modular foot platform arranged therein.

In rail vehicles or a driven railway vehicle serving for traction, use is generally made of height adjustable driver seats in order to enable the required forward visibility for vehicle drivers or train drivers of extremely different height. So that the vehicle drivers can also continue to reach the required pedals with their foot and can support their feet comfortably, foot platforms which are likewise height adjustable are required.

It is therefore proposed, in DE 20 2016 004 888 U1, to move a foot platform from the bottom upward by means of a scissor-mechanism structure. In this case, two lifting scissor mechanisms or a pair of lifting scissor mechanisms are or is arranged between a base plate and a step plate and are or is in each case fastened to said plates. In addition, the foot platform has a mechanical spring unit in combination with a pneumatic cylinder. Since the base plate, the step plate and the lifting scissor mechanisms form one unit, the entire foot platform has to be individually adapted and designed depending on the vehicle or project requirement. It is thus possible that a completely new foot platform has to be designed due to only small modifications, for example a modified foot recess size in the driver's cab. However, the production and the installation of a completely new foot platform can be very time-consuming and thus also very costly.

As a rule, the height adjustment is also actuated by means of an operating element spatially separate from the foot platform, for example by means of a switch or button arranged on the driver's console. The driver's console is generally arranged here above the footwell in the driver's cab. This additionally increases the installation outlay if the operating element and a connection of the operating element to the foot platform have to be adapted to the driver's console.

SUMMARY OF THE INVENTION

It is the object of the present invention to provide an independently height adjustable foot platform which meets a multiplicity of vehicle and project requirements, wherein the foot platform is installed rapidly, simply and at low cost.

This object is achieved by a modular foot platform for a driver's cab of a rail vehicle, comprising at least a base frame which has a height adjustment mechanism, an intermediate frame mounted on the base frame, a step plate disposed on the intermediate frame, the height adjustment mechanism including at least one operating element which is at least partially disposed in a region on or above the top side of the step plate, the top side facing away from the base frame. The object is also achieved by a rail vehicle having a driver's cab and the modular foot platform disposed therein and by a method for installing a modular foot platform for a driver's cab of a rail vehicle.

The modular foot platform according to the invention for a driver's cab or a cockpit of a rail vehicle or traction unit comprises at least the following components:

One component is a base frame which can be used as a type of standardized base frame for various vehicles, such as, for example, tramways, metros, locomotives, local trains and high-speed trains and for a very wide variety of customer projects. The base frame here has a height adjustment mechanism with which the foot platform can be moved to any height. The basic size of the base frame and the height adjustment mechanism belonging thereto are always identical even for different requirements and therefore do not have to be modified or adapted in addition.

A further component of the modular foot platform is an individual intermediate frame or stiffening frame which is mounted or placed on the base frame. The intermediate frame firstly has a stabilizing function for the base frame and a supporting function for a step plate or the footrest of a vehicle driver. Said intermediate frame can be configured and mounted on the base frame in such a manner that it is adapted individually to a foot recess in a driver's cab in accordance with the vehicle and project requirements. The intermediate frame is thus not a standardized individual assembly (wherein an "individual assembly" can also be understood as meaning an individual component), but rather a vehicle- or project-specific individual assembly.

A third component is a step plate resting on the intermediate frame. The step plate or else, for example, an additional plate which surrounds the side walls of the base frame such that, for example, a person's foot, etc., cannot pass between the height adjustment mechanism can likewise be configured in a project-specific manner.

The height adjustment mechanism comprises at least one operating element with which the height adjustment mechanism can be triggered and which can be operated, for example, by tapping by a vehicle driver's foot. The operating element is arranged here individually for foot operation at least partially in a region on or above the top side of the step plate, the top side facing away from the base frame. The operating element can thus preferably be arranged directly on a surface of the step plate. However, the operating element can likewise also be preferably arranged at a short distance above the surface of a step plate and, for this purpose, can rest, for example, as will be explained later on, on a type of covering plate or the like. It can likewise only partially project upward through the step plate to an extent such that it can be operated by the vehicle driver's foot.

Further operating elements, such as, for example, a pedal of a dead man's handle (frequently also called dead man's circuit), called Sifa pedal below, can also be arranged on the step plate. Such dead man's handles serve to stop a train by automatic application of the brakes if a rail vehicle driver becomes incapacitated during a journey. A horn actuation, a switch in order, for example, to fold in mirrors, or the like, can also be arranged on the step plate. Said operating elements can be configured and arranged individually.

It should be pointed out in this connection that the terms "top" and "bottom", etc. relate in general and also within the context of the present invention below to orientations in a conventional arrangement in space. In this case, "top" corresponds to facing in the direction of a ceiling and "bottom" corresponds to facing in the direction of a floor. The term "rear", with respect to the foot platform, means here in the direction of a designated vehicle driver's position (when the foot platform is installed and used as intended in the rail vehicle), i.e. the side closer to the vehicle driver. The "heel point" which describes a point or region on which a vehicle driver's heel normally or correctly rests on the foot platform during a journey in the rail vehicle is located here. The term "front", with respect to the foot platform, relates here to a front of the foot platform that faces in the direction of the interior of the foot recess, i.e. away from the vehicle driver and normally in the direction toward the front of the rail vehicle. The "longitudinal direction" of the foot platform defines the direction between the heel point and the front of the foot platform, i.e. the longitudinal direction runs in the direction of travel of a rail vehicle in which the foot platform is located.

In a corresponding method according to the invention for installing a modular foot platform according to the invention for a driver's cab of an operating vehicle, first of all a base frame is provided.

Subsequently, an intermediate frame is mounted or placed on the base frame. The intermediate frame can be mounted here on the base frame preferably by means of fastening means, for example screws.

A step plate is then arranged on the intermediate frame, said step plate also being able to be removed again, for example if required. However, the step plate may also be permanently installed.

The height adjustment mechanism of the base frame is provided with at least one operating element. Said operating element is at least partially arranged in a region on or above the top side of the step plate, said top side facing away from the base frame.

The time as to when the operating element is mounted within the installation method can vary. The operating element can thus be arranged on the intermediate frame, for example after the latter is mounted, or else has been mounted only after the step plate on the intermediate frame. This can depend on the specific configuration of the components or individual assemblies.

The modular foot platform according to the invention is therefore substantially formed from three modular individual assemblies. This reduction in the diversity of parts thus also simultaneously leads to a reduction in the maintenance outlay. The modular design with a "standardized" base frame for a multiplicity of rail vehicles, and the adaptable intermediate frame and the individually designable step plate enable the foot platform, whilst simultaneously reducing the diversity of parts, nevertheless to be very flexibly adaptable to project and customer-specific requirements.

Since the operating element is likewise arranged in the foot platform, to this extent a lower outlay on installation is also necessary than if the operating element is attached, for example, to the driver's console.

The above-described simple and rapid installation of the foot platform and the simplified adaptation of the foot platform can result, in particular, in a great saving on costs.

The modular foot platform can be arranged or installed in a foot recess of a driver's cab during the manufacturing of any desired rail vehicle.

However, the modular foot platform according to the invention can also be installed in a driver's cab of an already existing rail vehicle, in order to retrofit the latter.

Further particularly advantageous refinements and developments of the invention emerge from the dependent claims and from the following description, while the claims of one category of claims may also be developed analogously to the claim of another category of claims and the relevant parts of the description, and in particular individual features of different exemplary embodiments or variants may also be combined to form new exemplary embodiments or variants.

In order to set the height of the foot platform easily and continuously, the height adjustment mechanism of the base frame preferably comprises a lifting table or is configured as a lifting table, particularly preferably a scissor-mechanism lifting table or a scissor mechanism having at least one lifting scissor mechanism, preferably two lifting scissor mechanisms operating in parallel or mounted in parallel. Said lifting scissor mechanism connects a base frame lower part (base) of the scissor-mechanism lifting table or base frame to a base frame upper part which is movable with respect to the base frame lower part.

The scissor mechanism preferably has two articulated fixed bearings and two articulated movable bearings, wherein the two front bearings are preferably movable and the two rear bearings (in the region of the heel point) are preferably fixed.

The lifting scissor mechanism is preferably arranged laterally in the base frame rather than as otherwise likewise customary centrally in the base frame. This has the advantage that, for example, lines of operating elements, etc. can more easily be laid and accommodated in the base frame.

The height adjustment mechanism may comprise, as actuator, for example a hydraulic cylinder which is operated, for example, by a spindle motor. However, the height adjustment mechanism preferably comprises, as actuator, at least one spring, particularly preferably at least one gas-filled compression spring. The actuator, preferably the spring or gas-filled compression spring, is connected parallel to the lifting scissors mechanism to the base frame lower part and to the base frame upper part of the base frame, preferably in a movable, for example articulated, manner.

In order to trigger the actuator, for example spring force, in particular the compressive force of the gas-filled compression spring, the height adjustment mechanism preferably comprises at least one Bowden cable which is connected to the actuator, in particular to the spring or gas-filled compression spring, and to the operating element.

If the vehicle driver, for example with a toe, taps the operating element, for example from the rear, i.e. as seen from the heel point, the gas-filled compression spring is released and the foot platform moves from the bottom upward. When the operating element is released, the foot platform then remains at the desired height position of the vehicle driver. By simultaneously loading the foot platform and pressing the operating element, the vehicle driver can adjust the foot platform to be lower again.

When required, it is optionally possible for additional actuators, in particular gas-filled compression springs, to be integrated in the base frame or lifting mechanism, said actuators being able to assist the gas-filled compression springs in a lowermost position of the foot platform.

So that the Bowden cable is not wedged in, for example, by the scissors mechanism during a height adjustment, the Bowden cable can be attached to a fastening, for example an installation plate, of the base frame. In order to arrange the Bowden cable on the mounting plate, the latter preferably has holes at which the Bowden cable can be attached or fixed, for example, to cable connectors or the like on its route from the gas-filled compression spring to the operating element. Sufficient length compensation of the Bowden cable due to the travel of the gas-filled compression spring and a sufficiently fixed laying to protect, for example, against catching and/or bending of the Bowden cable are thus realized.

So that a vehicle driver can easily reach the operating element on the step plate while said vehicle driver is sitting, for example, on the driver's chair, in order, as already mentioned, to change the height of the foot platform, preferably by at least up to 150 mm, a lower edge of the operating element is preferably arranged at a distance of at maximum 10 mm and particularly preferably of at maximum 5 mm on the top side of the step plate, the top side facing away from the base frame.

The operating element for adjusting the height of the foot platform is generally operated only once by the vehicle driver prior to the start of a journey and rarely during the journey. Other buttons or switches, such as, for example, a Sifa pedal and a horn button, have to be reached continuously or relatively rapidly and simply. In order to create more space for such buttons or switches, although the operating element is still comfortably reachable by a vehicle driver's feet for the height adjustment, it is preferably arranged outside a main action region of the feet. The main action region describes a region on the step plate that the vehicle driver can reach particularly rapidly and easily with only very small movements of the feet. Buttons and switches which have to be operated frequently and rapidly by the vehicle driver can now be arranged in a freely selectable manner in said region.

In a particularly preferred exemplary embodiment of the foot platform according to the invention, the step plate has a cutout or opening for the operating element.

The operating element can then be advantageously mounted on the base frame or preferably on the intermediate frame during the installation in such a manner that the operating element projects through the cutout in the step plate. For particularly convenient installation, the clear size of the cutout is preferably larger than the external dimensions of the operating element, i.e. the operating element can be pushed completely through the cutout. The cutout for the operating element can be a hole in the step plate or else a cutout at the edge of the step plate if, for example, the operating element is arranged at the edge of the foot platform outside the above-described main action region.

At least one covering plate which at least partially covers the cutout of the step plate is preferably arranged between the operating element and the top side of the step plate, said top side facing away from the base frame.

When required, the covering plate can easily be removed again, and therefore, for example, the Bowden cable and the gas-filled compression spring together with the operating element can be relatively simply and rapidly removed and, for example, maintained or exchanged. In addition, easy access and exchange of the step plate operating elements and of the lines thereof can be achieved, for example, by means of a removable step plate, as already mentioned.

In order to further simplify the installation, the intermediate frame preferably also has at least one cutout through which, for example, maintenance work on the height adjustment mechanism located below the intermediate frame can be carried out without it being necessary to additionally remove the intermediate frame from the base frame.

In order to achieve as ergonomic an alignment as possible for a vehicle driver's foot, the step plate is not aligned horizontally, but rather in the manner rising obliquely forward in the longitudinal direction of the base frame. By this means, the foot can also be placed obliquely onto the step plate, wherein a heel point is located at a lower position of the step plate.

For this purpose, the base frame preferably has one or more supporting regions which are correspondingly oriented in a manner rising obliquely forward in the longitudinal direction of the base frame and onto which the intermediate frame or the step plate can be placed.

The supporting regions furthermore have the advantage that they can limit the overall height. This is because one criterion in the design of a foot platform is to implement the height adjustment range and the position of the heel point in accordance with the standard EN 161861/1. On the basis of these criteria, most foot platforms in existence take up a relatively large installation space.

In order to limit the installation height and nevertheless to permit different angles of orientation of the step plate without having to exchange the latter, the base frame has at least two standardized supporting regions with different angular positions with respect to a lower side of the foot platform. The lower side here is a virtual plane on which the foot platform stands.

The supporting regions with different angular positions can be realized, for example, by means of a bent supporting bracket which has a number of bends preferably corresponding to the number of different angular positions. The support or the supporting bracket preferably has a supporting region with an 8° inclination or angular position and preferably a supporting region with a 15° inclination or angular position.

The supporting regions and the supporting bracket are preferably arranged on a front upper region of the base frame, i.e. on the base frame upper part or on top of the lifting table, for example in the form of a sheet metal part angled from the base frame upper part. In addition, the base frame preferably also has a lower support which comprises a rear part of the base frame and is located below the upper supporting region. If, for example, a 15° inclination of the step plate is now intended to be reached, the intermediate frame is placed onto the supporting region with a 15° inclination of the upper supporting bracket and onto the lower support. If the lower support has only one angular position, for example the 15° inclination instead of the 8° inclination of the upper supporting bracket, a corresponding intermediate element can preferably be placed onto the lower support in order thereby to achieve a compensation between the 15° inclination of the lower supporting bracket of the angled sheet metal part and the 8° inclination of the upper support which comprises a rear part of the base frame. However, further supporting regions or supports with different degrees of inclination or angular positions may also be used, if this is desired.

Depending, therefore, on which supporting region the intermediate frame or the step plate is placed, different inclinations or orientations of the step plate can thus be achieved.

An arrangement of the individual components of the height adjustment mechanism in the foot platform can also have an influence on the height of the resulting foot platform. For this reason, the spring or gas-filled compression spring is preferably arranged in a longitudinal direction in the base frame of the foot platform according to the invention. The lifting scissor mechanism can preferably also be arranged in a longitudinal direction in the base frame of the foot platform according to the invention. A relatively low overall height can thereby be achieved. This preferably achieves an overall height of at maximum 70 mm, particularly preferably of at maximum 58 mm, of the lifting table in which the lifting mechanism is arranged, i.e. of the base frame without the additional components, such as the sheet metal part which is angled from the base frame upper part, for realizing the angular position of the step plate.

A further means for designing the foot platform to be relatively compact is to pull the intermediate frame preferably obliquely downward and rearward beyond the base frame in the longitudinal direction of the foot platform. By this means, the intermediate frame extends in the longitudinal direction of the foot platform preferably to the rear beyond the base frame by at least 50 mm, particularly preferably at least 200 mm, i.e. in the direction of the designated position of the vehicle driver. By means of the intermediate frame being pulled out, the heel point can therefore also be pulled further in the direction of the vehicle driver or downward, wherein a heel point lies on the step plate below an upper edge of the lifting table.

The heel point preferably lies here at least 30 mm below the upper edge of the lifting table, particularly preferably approx. 34 mm below the upper edge of the lifting table.

The invention will be explained once again in more detail below using exemplary embodiments with reference to the attached figures. In the various figures, identical components are provided with identical reference numbers.

DETAILED DESCRIPTION OF THE INVENTION

FIGS. 1 to 5 show the design of a modular foot platform 1 according to the invention and will therefore be described together.

Figure 1:
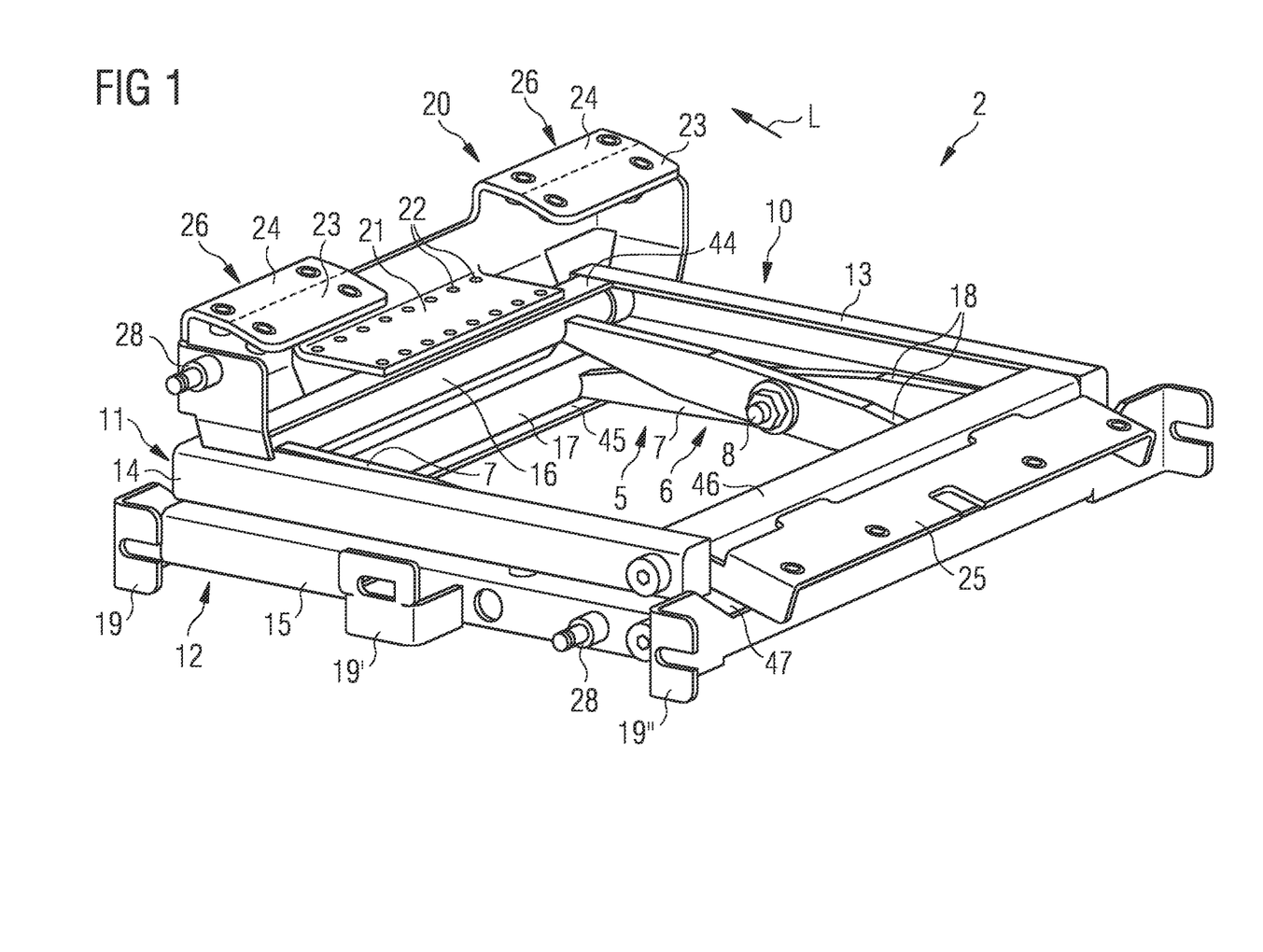
FIG. 1 shows a perspective illustration of a base frame for the installation of an exemplary embodiment of a modular foot platform according to the invention.

FIG. 1 shows a base frame 2 of the modular foot platform 1. The base frame 2 has a height adjustment mechanism 5, here a lifting table 6 or scissors-mechanism lifting table 6 having two lifting scissor mechanisms 7. The two levers 18 of the lifting scissor mechanism 7 are connected to each other in an articulated manner via a fastening means 8, here a screw 8, at a center axis or axis of rotation of the lifting scissor mechanism 7. The levers 18 of the lifting scissor mechanism 7 are fastened on the end sides in each case to a framework 10 of the base frame 2.

The lifting scissor mechanisms 7 are arranged here in the longitudinal direction L parallel to one another in the framework 10 and are located laterally on the right and left on the framework 10, as a result of which, for example, lines or the like of operating elements can more easily be arranged in the base frame 2. The base frame 2 is therefore constructed symmetrically here.

The framework 10 comprises two substantially rectangular frames 11, 12 lying one above the other. The lower frame 12 here forms the base frame lower part 12, the upper frame 11 the base frame upper part 11. The base frame lower part 12 and the base frame upper part 11 of the framework 10 are connected to each other in a movable, namely height adjustable, manner via the lifting scissor mechanism 7 and thus together with the lifting scissor mechanism 7 form the lifting table 6.

The upper frame 11 and the lower frame 12 each have longitudinal profiles 13, 14, 15, 27 running on both sides in the longitudinal direction L and transverse profiles 44, 45, 46, 47 running transversely at the front and rear and connecting the longitudinal profiles 13, 14, 15, 27 to one another on the two sides.

The profiles 13, 14 of the upper frame 11, said profiles extending in the longitudinal direction L, and the profiles 15 of the lower frame 12, which profiles are located below said profiles (because of the perspective in FIG. 1, one profile cannot be seen here) each have a sliding rail here. Between the sliding rails of the upper frame 11 and of the lower frame 12, in each case two round rods 16, 17 (only one round rod can be seen in FIG. 1) extend parallel to the transverse profiles 44, 45, 46, 47 of the frames 11, 12. The ends of the levers 18 of the lifting scissor mechanisms 7 are fastened to the round rods 16, 17.

At the front here of the framework 10, on a front side V of the foot platform 1, a type of folded plate 20 is fastened to a top side of the upper frame 10. The folded plate 20 here has two supporting surfaces or supporting brackets 26 on its top side. One supporting bracket 26 here is a right part of the plate 20 and one supporting bracket 26 is a left part of the plate 20. The supporting brackets 26 run slightly obliquely downward to the rear. The supporting brackets 26 are bent here, i.e. they have two different supporting regions 23, 24 having in each case a different angle of inclination.

A further angled part, here a fastening 21, which has a plurality of holes 22 is located on a lower side of the plate 20. The fastening 21 extends substantially horizontally in the longitudinal direction L over a partial region of the base frame 2.

On the rear side of the base framework 10 or rear side H of the foot platform 1, a further support or supporting bracket 25 which likewise runs out obliquely rearward and downward is located on the upper frame 11.

Fastening tabs 19, 19', 19" via which the foot platform 1 can be fastened in the driver's cab 51 of a rail vehicle 50 are located here at the corners of the outer sides of the lower frame 12 of the framework 10. Alternatively, a plate or a cover can be additionally and when required attached, for example, to the fastening tabs 19, 19', 19", said plate or cover surrounding the foot platform 1 at its sides such that, for example, the foot of a person cannot enter the interior of the foot platform and therefore pass between the scissor mechanism.

The base frame 2 shown here can be used for diverse project and customer requirements without its dimensions having to be changed. It preferably has a maximum width of 500 mm, particularly preferably of 430 mm.

The base frame 2 preferably also has a maximum length of 400 mm, particularly preferably of 320 mm.

Figure 6:
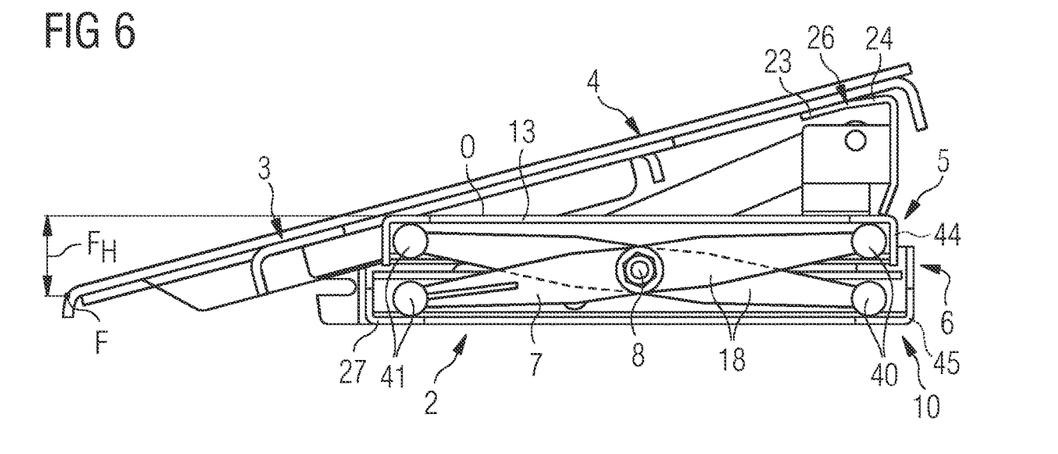
FIG. 6 shows a sectional view of the base frame and of the intermediate frame of the modular foot platform in the installation state according to FIG. 4 in a first position.

The height of the base frame 2 is also standardized. In the move together state (as can be seen in FIG. 6 and which will be explained in more detail later), the lifting table 6 in which the lifting mechanism is arranged, i.e. the base frame 2 without the additional components, such as the plate 20 bent from the upper frame 11, for realizing the angular position of the step plate 4, preferably has a maximum height of 70 mm, particularly preferably of 58 mm.

Figure 7:
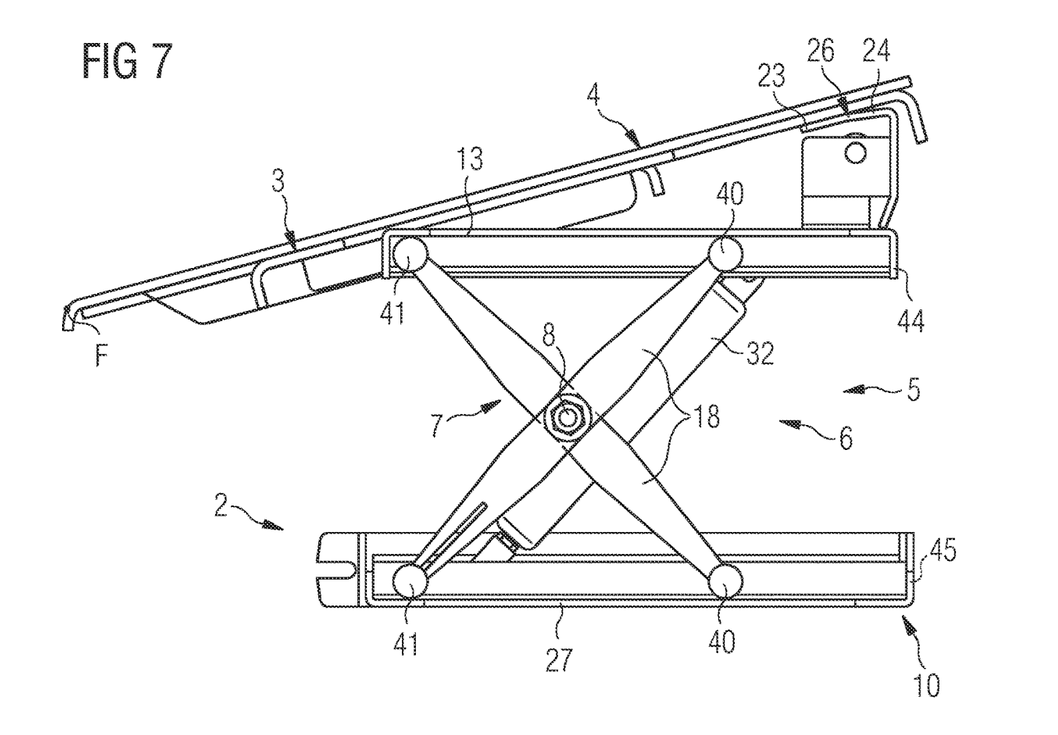
FIG. 7 shows a sectional view of the base frame and of the intermediate frame of the foot platform as in FIG. 6, but in a second position.

In the extended state of the base frame 2 (as can be seen in FIG. 7 and which will be explained in more detail later), the lifting table 6 preferably has a maximum height of 260 mm, particularly preferably of 208 mm.

Figure 2:
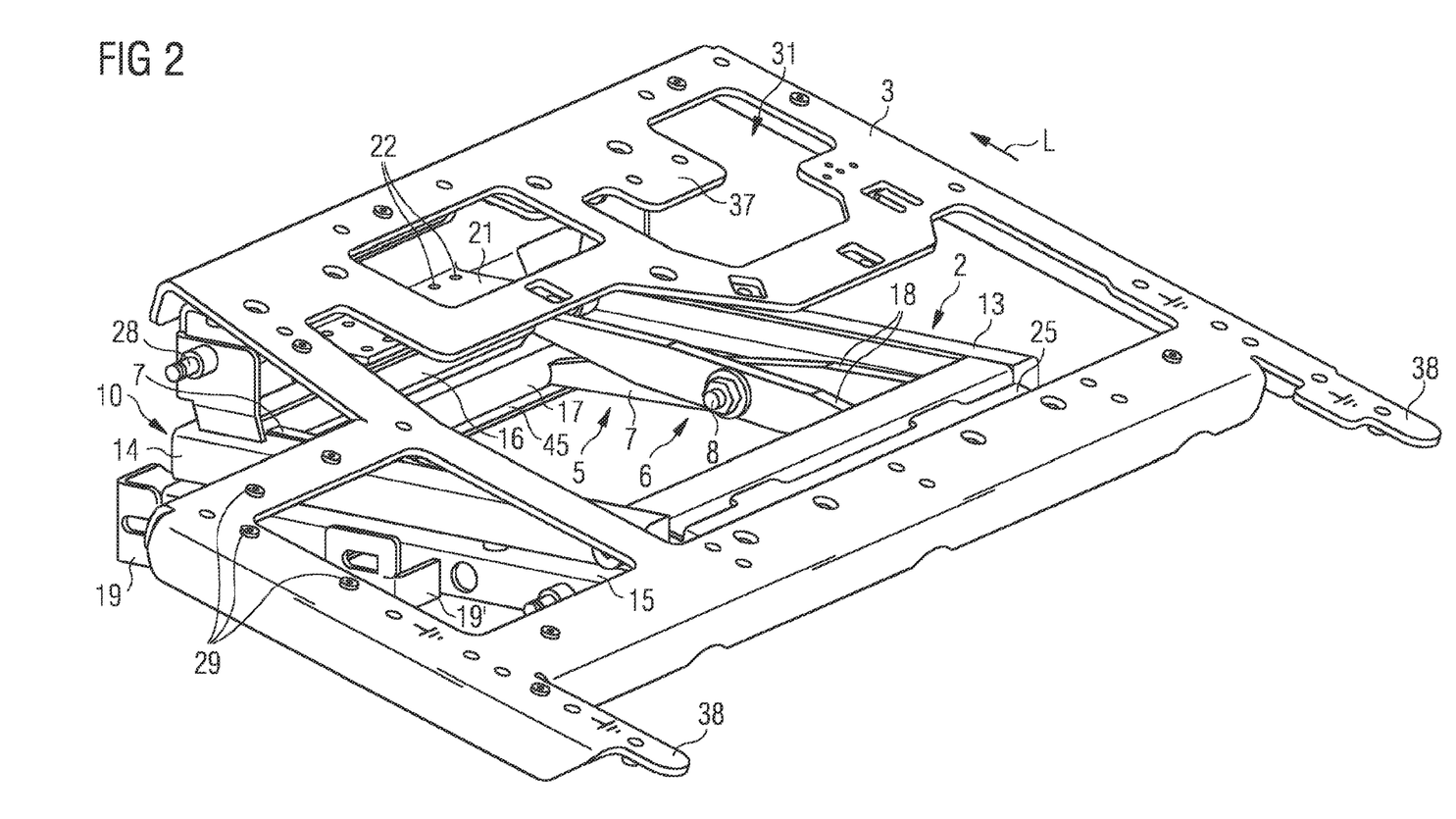
FIG. 2 shows a perspective illustration of the base frame according to FIG. 1 with an intermediate frame mounted thereon according to a second installation step for installing the modular foot platform.

In a second installation step, an intermediate frame 3 can then be placed onto the supports 25, 26 and mounted thereon by means of screws and/or rivet nuts 29. FIG. 2 shows in this regard the base frame 2 and intermediate frame 3 mounted thereon. The resulting angle of inclination of the intermediate frame 3 is thus produced depending on which supporting region 23, 24 of the supporting bracket 26 the intermediate frame 3 is placed.

The intermediate frame 3 has a plurality of openings through which, for example, operating elements can be passed. The openings also permit maintenance work, for example to the height adjustment mechanism 5, to be able to be carried out without having to remove the intermediate frame 3.

In order to support and to setup the lifting table 6 or the lifting scissor mechanism 7 in order thereby to move the lifting table 6 vertically upward, in a third installation step two gas-filled compression springs 32 here are connected to the lifting table 6 in a manner acting parallel to the lifting scissor mechanisms 7 (because of the perspective in FIGS. 1 to 5, one of the gas-filled compression springs 32 can be seen only with difficulty since said gas-filled compression spring 32 is concealed by the longitudinal profiles 13, 27). Bowden cables 33 which are connected to an operating element 34 for the height adjustment mechanism 5 are connected to the gas-filled compression springs 32.

Figure 3:
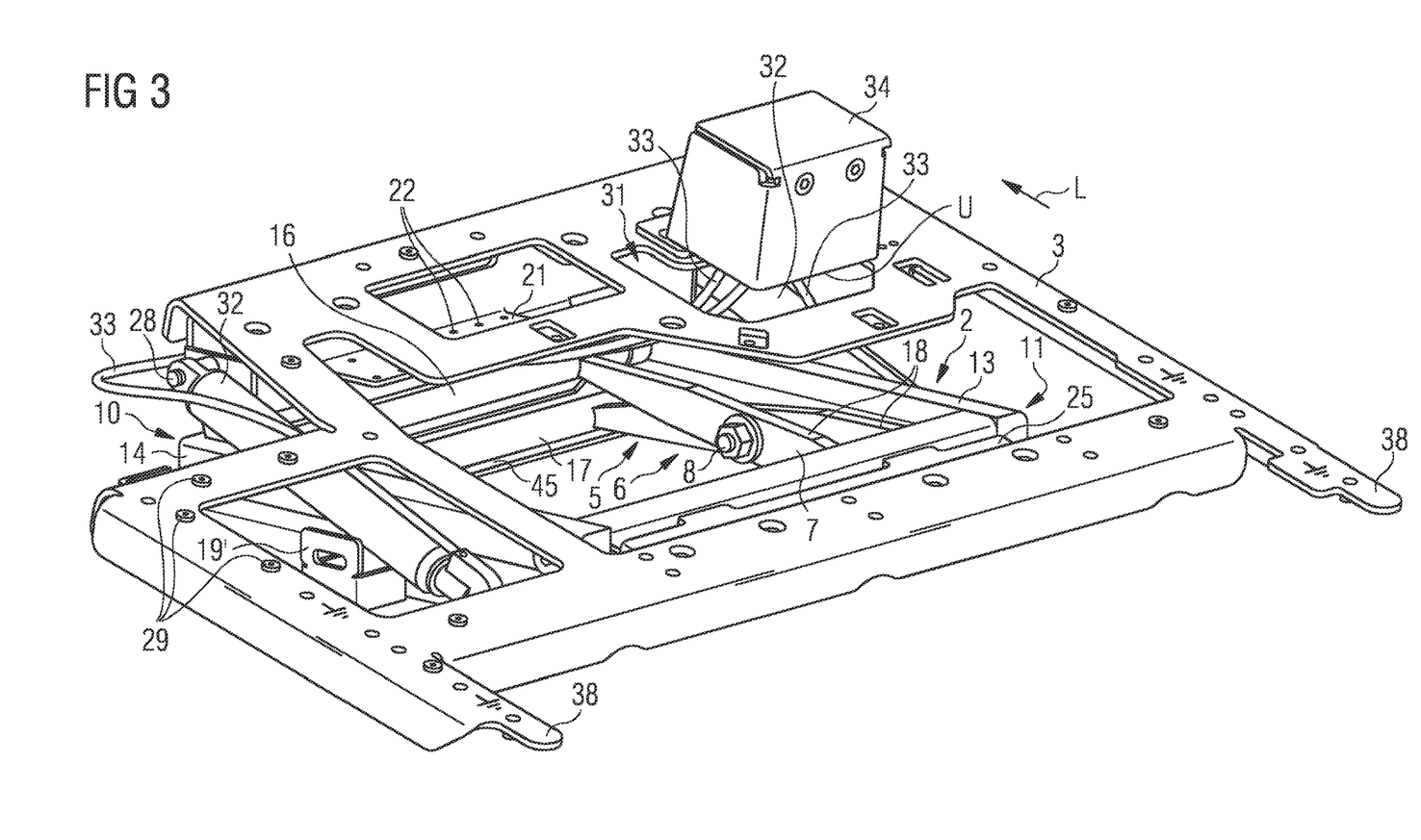
FIG. 3 shows a perspective illustration of the base frame and of the intermediate frame according to FIG. 2 with an operating element arranged on the intermediate frame according to a third installation step for installing the modular foot platform.

The gas-filled compression springs 32 together with the Bowden cables 33 and the operating element 34 can be supplied in already preassembled form such that, as shown in FIG. 3, they can be attached as a connected component. If said components are then intended to be fitted, the gas-filled compression springs 32 together with the Bowden cables 33 which are connected to the operating element 34 are passed from above through an opening 31 in the intermediate frame 3. The gas-filled compression springs 32 are then fastened laterally on the outside of the framework 10 of the base frame 2 firstly to the base frame lower part 12 and secondly to the base frame upper part 11 by means of receptacles 28. The gas-filled compression springs 32 are located here in the longitudinal direction L of the base frame 2 on the left side (see FIG. 3) and on the right side of the base frame 2. The Bowden cables 33 are then fastened at the holes 22 of the fastening 21, for example by means of clips or cable connectors or the like, such that they are protected against catching or bending.

The operating element 34 is fitted in the manner of a projection 37 or tab 37 of the intermediate frame 3 that extends into an opening 31 in the intermediate frame 3. The operating element 34 is therefore attached to the intermediate frame 3.

However, the operating element 34, the Bowden cables 33 and the gas-filled compression springs 32 may also be supplied individually and fitted and coupled to one another in situ.

After attachment of the operating element 34, the gas-filled compression springs 32 and the Bowden cables 33, the height adjustment mechanism 5 is already fully functional and the base frame 2 can be adjusted in height.

For this purpose, FIGS. 6 and 7 show two different positions of the base frame 2 with the intermediate frame 3 and a step plate 4, which is arranged thereon, of the modular foot platform 1. For better clarity, the operating elements have not been illustrated here.

FIG. 6 shows the parts of the modular foot platform 1 in a lowermost position or in a brought together state. It can clearly be seen that the intermediate frame 3 extends rearward a good distance beyond the base frame 2 in the longitudinal direction thereof. This can also be seen clearly in FIGS. 2 and 3. The intermediate frame 3 here has two projections 38 (see FIG. 2) on which the step plate 4 is placed and which extend downward to the rear beyond the base frame 2. Accordingly, the step plate 4 also extends downward to the rear beyond the base frame 2. The heel point F of a vehicle driver that has been shown by way of example in FIGS. 4 to 7 therefore lies, as already mentioned, in front of the base frame 2 and below the upper edge O of the upper frame 11 of the framework 10 of the base frame 2. The distance $F_H$ between the upper edge O of the upper frame 11 and the heel point F is preferably at least 30 mm, particularly preferably approx. 34 mm. This has made it possible for the requirement of EN 16186-1 to be met with a particularly low overall height.

FIG. 7 shows these parts of the modular foot platform 1 in a second position in which the lifting scissor mechanisms 7 are moved vertically upward. However, owing to their arrangement, only one lifting scissor mechanism 7 can be seen in FIGS. 6 and 7 since the second lifting scissor mechanism 7 is concealed by the first lifting scissor mechanism 7. As can be seen particularly readily here, the lifting scissor mechanism 7 is coupled displaceably to the longitudinal profiles 13, 27 via two rear fixed bearings 41 oriented vertically with respect to each other and via two front movable bearings 40 oriented vertically with respect to each other.

Figure 4:
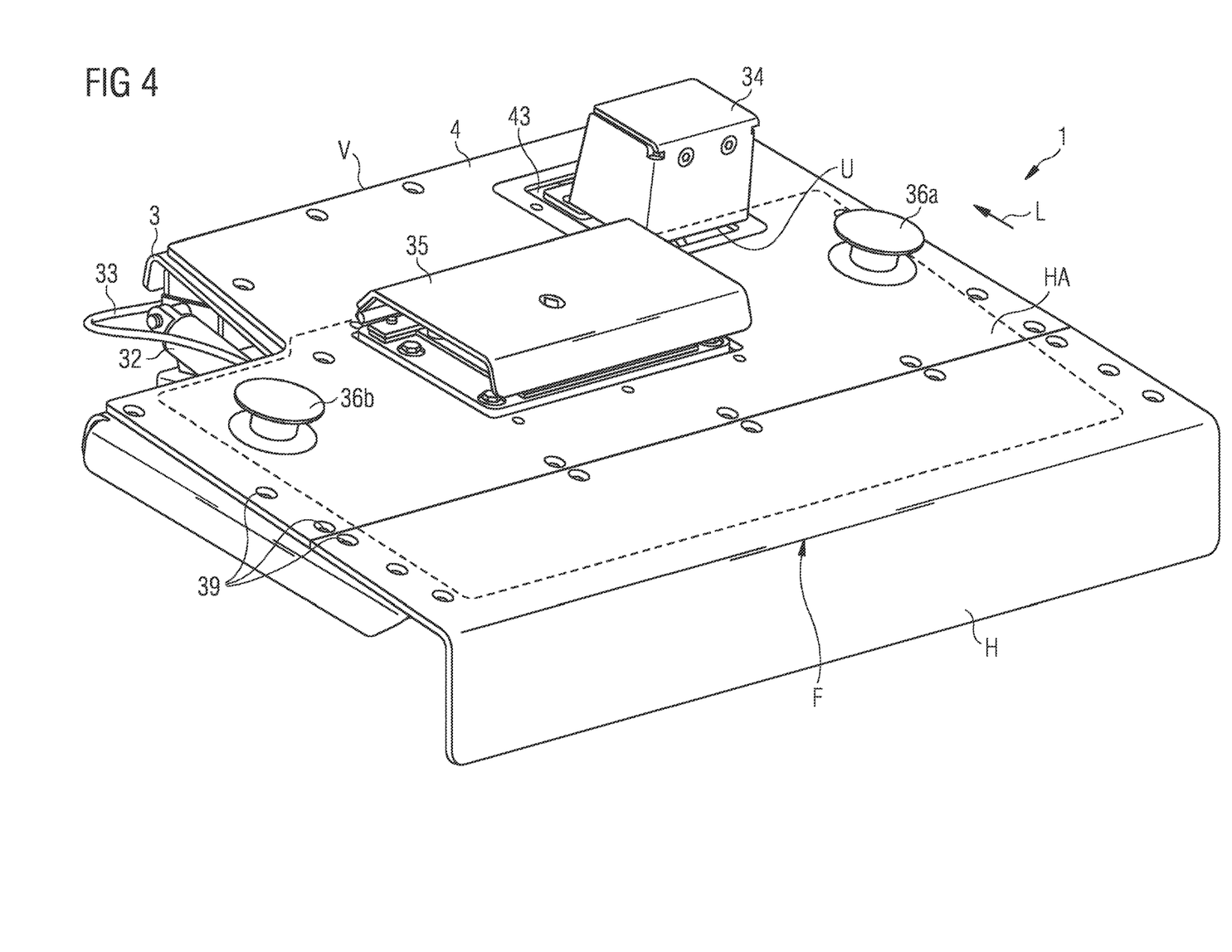
FIG. 4 shows a perspective illustration of the base frame, the intermediate frame and the operating element according to FIG. 3 with a step plate placed on the intermediate frame according to a fourth installation step for installing the modular foot platform.

FIG. 4 shows the foot platform 1 to be mounted according to a further installation step in which the step plate 4 has been placed from above onto the intermediate frame 3. The step plate 4 can then be simply mounted on the intermediate frame 3 by means of screws 39.

A Sifa pedal 35, a horn button 36a and a button 36b for folding mirrors of a rail vehicle 50 in are already preassembled here on the step plate 4. However, the components may also be attached only after the step plate 4 is attached. An attachment of further components would also be possible. The arrangement of the components is also freely selectable and can be correspondingly adapted.

In addition, the step plate 4 shows a cutout 43 which is arranged on the intermediate frame 3 corresponding to a position of the operating element 34 such that the operating element 34 projects through the cutout 43.

The operating element 34 is arranged outside a main action region HA for a vehicle driver's feet. As a result, more space remains in the main action region HA for arranging the other components mentioned, for example the Sifa pedal 35 or the horn button 36a, in the main action region HA, which components have to be reached more frequently and rapidly or more easily than the operating element 34 for adjusting the height of the foot platform 1.

Figure 5:
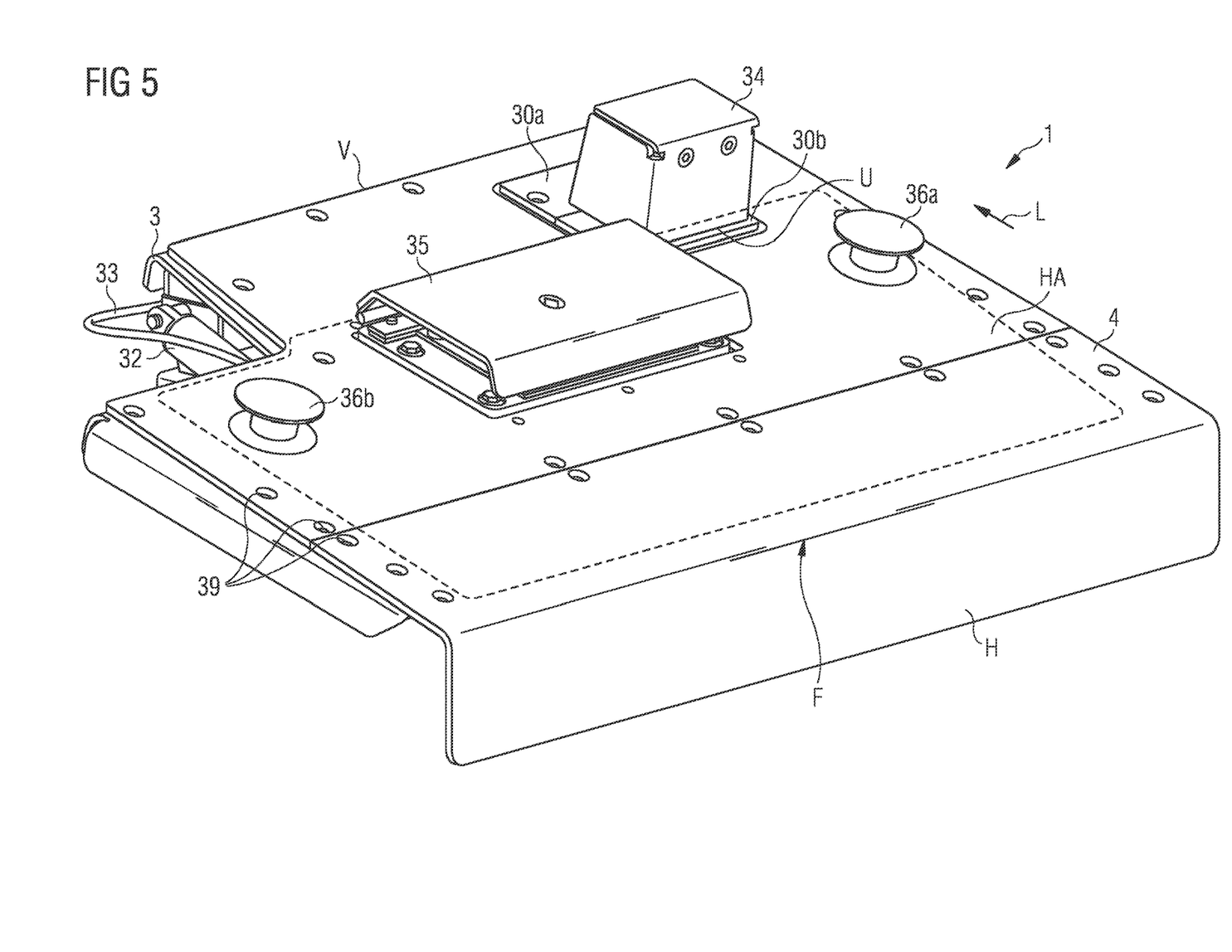
FIG. 5 shows a perspective illustration of the base frame, the intermediate frame, the operating element and the step plate according to FIG. 4 with two covering plates between the step plate and a lower edge of the operating element according to a fifth installation step for installing the modular foot platform.

In a final installation step, two covering plates 30a, 30b are pushed next to each other between the step plate 4 and a lower edge U of the operating element 34 such that the cutout 43 is completely covered here. If, for example, the step plate 4 is now intended to be removed, in order to more easily approach functional parts in the foot platform 1, the covering plates 30a, 30b can simply be removed and the step plate 4 can be pulled off upward again via the operating element 34 and removed. Furthermore, the operating element 34 possibly together with the Bowden cables 33 and the gas-filled compression springs 32 can then be easily maintained or exchanged.

Figure 8:
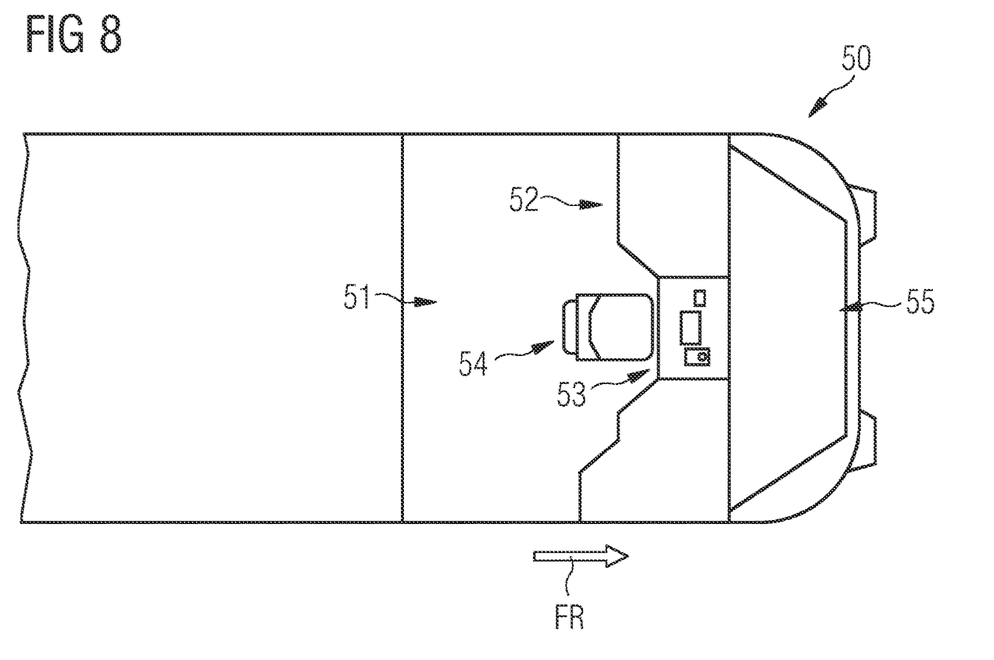
FIG. 8 shows schematically a top view of a driver's cab of a traction unit with a modular foot platform arranged in the driver's cab.

FIG. 8 shows the front part of a rail vehicle 50 in which a driver's cab 51 of a vehicle driver is located. A windshield 55 is located at the front as customary in the direction of travel FR of the rail vehicle 50. A driver's console 52 is arranged in the driver's cab 51 behind the windshield 55. In addition, a driver's chair 54 on which the vehicle driver can sit is located here behind the driver's console 52. In the driver's console 52, in front of the driver's chair 54 and behind the windshield 55, there is a foot recess 53 in which the modular foot platform 1 according to the invention is arranged.

Finally, it is once again pointed out that the device previously described in detail and the method depicted for installing a modular foot platform merely comprise exemplary embodiments that can be modified in a wide variety of ways by a person skilled in the art without departing from the scope of the invention. For example, the step plate and the intermediate frame can be configured as desired and combined with the base frame. Furthermore, the use of the indefinite article "a" or "an" does not exclude the possibility that the features concerned may also be present in the plural. Similarly, the term "unit" does not exclude the possibility that the components concerned consist of a plurality of interacting partial components which may possibly also be spatially distributed.

The invention claimed is:

1. A modular foot platform for a driver's cab of a rail vehicle, the modular foot platform comprising:
    a base frame having a height adjustment mechanism, said base frame and said height adjustment mechanism having a basic size being identical for different requirements to meet a multiplicity of vehicle and project requirements without modifications or adaptations;
    an intermediate frame mounted on said base frame;
    a step plate disposed on said intermediate frame, said step plate having a top side facing away from said base frame, said top side defining a region on or above said top side;
    said height adjustment mechanism including at least one operating element at least partially disposed in said region on or above said top side of said step plate, said at least one operating element triggering said height adjustment mechanism responsive to tapping by a vehicle driver's foot and said at least one operating element being reachable by the vehicle driver's feet, but disposed outside a main action region of the driver's feet;
    a heel point of the foot platform, a front of the foot platform and a longitudinal direction of the foot platform defined as a direction between said heel point and said front of the foot platform mounted in the rail vehicle, said longitudinal direction running in a direction of travel of the rail vehicle;
    said height adjustment mechanism including a scissor-mechanism lifting table having at least one lifting scissor mechanism, said at least one lifting scissor mechanism disposed laterally in said base frame in said longitudinal direction;
    said height adjustment mechanism including at least one spring or at least one gas-filled compression spring; and
    said base frame having at least two supporting regions for said intermediate frame, and said supporting regions have different angular positions relative a lower side of the foot platform.

2. The modular foot platform as claimed in claim 1, wherein said height adjustment mechanism includes at least one Bowden cable connected to said at least one spring and to said at least one operating element.

3. The modular foot platform according to claim 1, wherein said at least one spring is disposed in said base frame in said longitudinal direction of the foot platform.

4. The modular foot platform according to claim 1, wherein said scissor-mechanism lifting table has an upper edge, and said heel point lies on said step plate below said upper edge of said scissor-mechanism lifting table.

5. The modular foot platform according to claim 1, wherein said at least one operating element has a lower edge disposed at a distance of at most 10 mm above said top side of said step plate.

6. The modular foot platform according to claim 1, wherein said at least one operating element has a lower edge disposed at a distance of at most 5 mm above said top side of said step plate.

7. The modular foot platform according to claim 1, wherein said step plate has a cutout for said at least one operating element, and at least one covering plate at least partially covers said cutout and is disposed between said at least one operating element and said top side of said step plate.

8. A rail vehicle, comprising a driver's cab and a modular foot platform according to claim 1 disposed in said driver's cab.

9. A modular foot platform for a driver's cab of a rail vehicle, the modular foot platform comprising:
    a base frame having a height adjustment mechanism, said base frame and said height adjustment mechanism having a basic size being identical for different requirements to meet a multiplicity of vehicle and project requirements without modifications or adaptations;
    an intermediate frame mounted on said base frame;
    a step plate disposed on said intermediate frame, said step plate having a top side facing away from said base frame, said top side defining a region on or above said top side;
    said height adjustment mechanism including at least one operating element at least partially disposed in said region on or above said top side of said step plate, said at least one operating element triggering said height adjustment mechanism responsive to tapping by a vehicle driver's foot and said at least one operating element being reachable by the vehicle driver's feet, but disposed outside a main action region of the driver's feet;
    a heel point of the foot platform, a front of the foot platform and a longitudinal direction of the foot platform defined as a direction between said heel point and said front of the foot platform mounted in the rail vehicle, said longitudinal direction running in a direction of travel of the rail vehicle;

said height adjustment mechanism including a scissor-mechanism lifting table having at least one lifting scissor mechanism, said at least one lifting scissor mechanism disposed laterally in said base frame in said longitudinal direction;
said height adjustment mechanism including at least one spring or at least one gas-filled compression spring;
said height adjustment mechanism including at least one Bowden cable connected to said at least one spring and to said at least one operating element; and
said base frame has having at least one fastening to which said at least one Bowden cable is attached.

* * * * *